(12) United States Patent
Johnson et al.

(10) Patent No.: US 8,189,857 B2
(45) Date of Patent: May 29, 2012

(54) METHODS AND PROCESSES FOR DETECTING A MARK ON A PLAYING SURFACE AND FOR TRACKING AN OBJECT

(75) Inventors: Henri Johnson, Winsemere, FL (US); Hendrik Amos Brunner, Durbanville (ZA); Heinrich Rohwer, Strand (ZA); Jacques Pierre du Toit, Stellenbosch (ZA); Trevor Wyndham Rees, Somerset West (ZA); Gideon Zuurmond, Brackenfell (ZA)

(73) Assignee: EDH Holding (Pty) Ltd, Stellenbosch (ZA)

( * ) Notice: Subject to any disclaimer, the term of this patent is extended or adjusted under 35 U.S.C. 154(b) by 912 days.

(21) Appl. No.: 12/205,498

(22) Filed: Sep. 5, 2008

(65) Prior Publication Data
US 2009/0067670 A1    Mar. 12, 2009

Related U.S. Application Data

(60) Provisional application No. 60/967,832, filed on Sep. 7, 2007.

(51) Int. Cl.
*G06K 9/00* (2006.01)
(52) U.S. Cl. ........ 382/100; 382/103; 382/106; 382/107; 382/181
(58) Field of Classification Search .................. 382/100, 382/103, 106, 107, 181
See application file for complete search history.

(56) References Cited

U.S. PATENT DOCUMENTS

| | | | |
|---|---|---|---|
| 4,800,292 A | 1/1989 | Gillett | |
| 4,855,711 A | 8/1989 | Harrop et al. | |
| 5,134,661 A | 7/1992 | Reinsch | |
| 5,138,322 A | 8/1992 | Nuttall | |
| 5,908,361 A | 6/1999 | Fisher et al. | |
| 5,954,599 A | 9/1999 | Lin | |
| 6,233,007 B1 | 5/2001 | Carlbom et al. | |
| 6,592,465 B2 | 7/2003 | Lutz et al. | |
| 6,765,565 B2 | 7/2004 | Sayers et al. | |

(Continued)

FOREIGN PATENT DOCUMENTS
EP    1 593 969    11/2005
(Continued)

OTHER PUBLICATIONS

International Search Report and Written Opinion issued in Corresponding International Application No. PCT/IB2008/003674 on Jun. 2, 2009.

*Primary Examiner* — Wesley Tucker
(74) *Attorney, Agent, or Firm* — Schwegman, Lundberg & Woessner, P.A.

(57) ABSTRACT

Systems and methods for detecting a mark left by an object on a playing surface are provided. A system for detecting a mark left by an impact of an object on a playing surface, the system including at least one processor coupled to a memory arrangement. The system may further include at least one camera for collecting a sequence of images of the playing surface before and after impact of an object. Additionally, the system may include an image processing system adapted to process at least a portion of the sequence of images to identify the mark left by the object on the playing surface. The system may also include a judgment processing system operative to determine the position of the mark relative to the feature of the playing surface.

33 Claims, 10 Drawing Sheets

U.S. PATENT DOCUMENTS

| | | | |
|---|---|---|---|
| 6,816,185 B2 | 11/2004 | Harmath | |
| 6,901,110 B1 | 5/2005 | Tsougarakis et al. | |
| 7,005,970 B2 | 2/2006 | Hodsdon et al. | |
| 7,030,905 B2 * | 4/2006 | Carlbom et al. | 348/157 |
| 2003/0142210 A1 | 7/2003 | Carlbom et al. | |
| 2006/0252017 A1 * | 11/2006 | Vorozhtsov et al. | 434/247 |
| 2006/0280249 A1 * | 12/2006 | Poon | 375/240.16 |
| 2008/0093498 A1 * | 4/2008 | Leal et al. | 244/3.2 |
| 2009/0017919 A1 * | 1/2009 | Brennan | 463/47 |

FOREIGN PATENT DOCUMENTS

| | | |
|---|---|---|
| WO | WO 01/41884 | 6/2001 |

* cited by examiner

METHODS AND PROCESSES FOR DETECTING A MARK ON A PLAYING SURFACE AND FOR TRACKING AN OBJECT

This application claims the benefit of priority under 35 U.S.C. §119(e) of U.S. Provisional Application No. 60/967,832, filed Sep. 7, 2007, the disclosure of which is incorporated herein by reference.

BACKGROUND OF THE INVENTION

I. Field of the Invention

The present disclosure relates to methods and systems for determining the position of a mark made by an object such as a ball or other object on a playing surface during a sporting event, particularly in situations where the mark may not be visible to the naked eye. The present disclosure also relates to methods and systems for determining the trajectory of a ball or other object, based in part on the position of the mark left by the ball on the playing surface.

II. Background Information

Officiating referees, judges and umpires in many sports, including tennis, cricket, soccer and baseball, have a need for a technological solution to assist in making boundary judgments in accordance with the rules of the sport.

Many concepts and attempts have been made in the past to develop systems for making or assisting in boundary judgments. These systems include electronic circuits buried into or applied on the playing surface, radar and other remote-sensing apparatus, and cameras. These methods have provided limited success at best, often at a high cost.

Generally, current commercial systems track the ball in flight and estimate its impact position relative to a system of coordinates that are determined through a process of prior calibration and measurement. Such systems only provide an indirect estimate of whether the ball touched a feature of the playing surface.

For example, professional Tennis has recently introduced a "challenge" system that allows the use of technology to determine a line call. This system requires an exceptionally difficult alignment of cameras relative to the tennis court lines. The system tracks the flight path of the tennis ball from the multiple camera images and estimates the impact point of the ball on the court surface. This system has caused considerable controversy due to reports that it sometimes makes incorrect judgments. Accordingly, current systems that estimate where a ball lands are flawed, and may actually increase the risk of an incorrect call rather than guard against it.

Another consideration is that the boundaries in the game often comprise lines that are painted or applied to the surface (s) of the court or field. These lines are usually not perfectly straight nor do they have constant width. The referee or umpire in the sport (e.g. in Tennis) is required to apply the rules relative to the actual lines, however imperfect they may be. Therefore, a system that relies on tracking the ball in a chosen framework of spatial coordinates needs to "know" every part of the line in great detail. To measure the lines of a sporting venue to this level of detail, for use in a ball-tracking solution, is an impractical quest at present. Conventional tracking/navigation type systems therefore provide results that are often contested.

In addition, in many sports, the ball and/or surface may deform. Further, the ball may skid and roll during the period of contact. Therefore, the notion of a singular impact point or position is flawed for many practical ball games. Because the mark of the ball on the surface is variable, it should be taken into account when deciding if a line was touched or not. A system that tracks the ball and predicts impact points relies on estimates of the ball mark. A typical system as used currently estimates an ellipsoidal mark. Considering that a judgment must be made on whether a line was touched by the ball or not, methods to estimate the track and mark of the ball cannot be a reliable indicator of a boundary infringement.

SUMMARY OF THE INVENTION

Consistent with implementations of the present invention, systems and methods for detecting a mark left by an impact of an object on a playing surface are disclosed. Further consistent with implementations of the present invention, systems and methods for tracking the trajectory of an object are also disclosed.

A process for detecting a mark left by an object on a playing surface may comprise collecting a sequence of images comprising at least one digital image of the playing surface prior to an impact of the object and at least one digital image of the playing surface after the impact. The process may further comprise processing the images of the playing surface taken before and after the impact to enhance changes in optical characteristics of the playing surface that result from the impact and to identify a mark left by the object on the playing surface relative to a feature of the playing surface. The process may also include transmitting information indicating the position of the object mark relative to the feature of the playing surface to an output device.

A system for detecting a mark left by an impact of an object on a playing surface may comprise at least one processor coupled to a memory arrangement. The system may also include at least one camera for collecting a sequence of images comprising at least one digital image of the playing surface prior to an impact of an object on the playing surface and at least one digital image of the playing surface after the impact. The system may also comprise an image processing system adapted to process at least a portion of the sequence of images to identify the mark left by the object on the playing surface.

Another system for detecting a mark left by an impact of an object on a playing surface may comprise at least one processor coupled to a memory arrangement. The system may also include at least one camera for collecting a sequence of images comprising at least one digital image of the playing surface prior to an impact of an object on the playing surface and at least one digital image of the playing surface after the impact. In addition, the system may comprise an image processing system adapted to perform differencing on at least a portion of the sequence of images to identify the mark left by the object on the playing surface.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
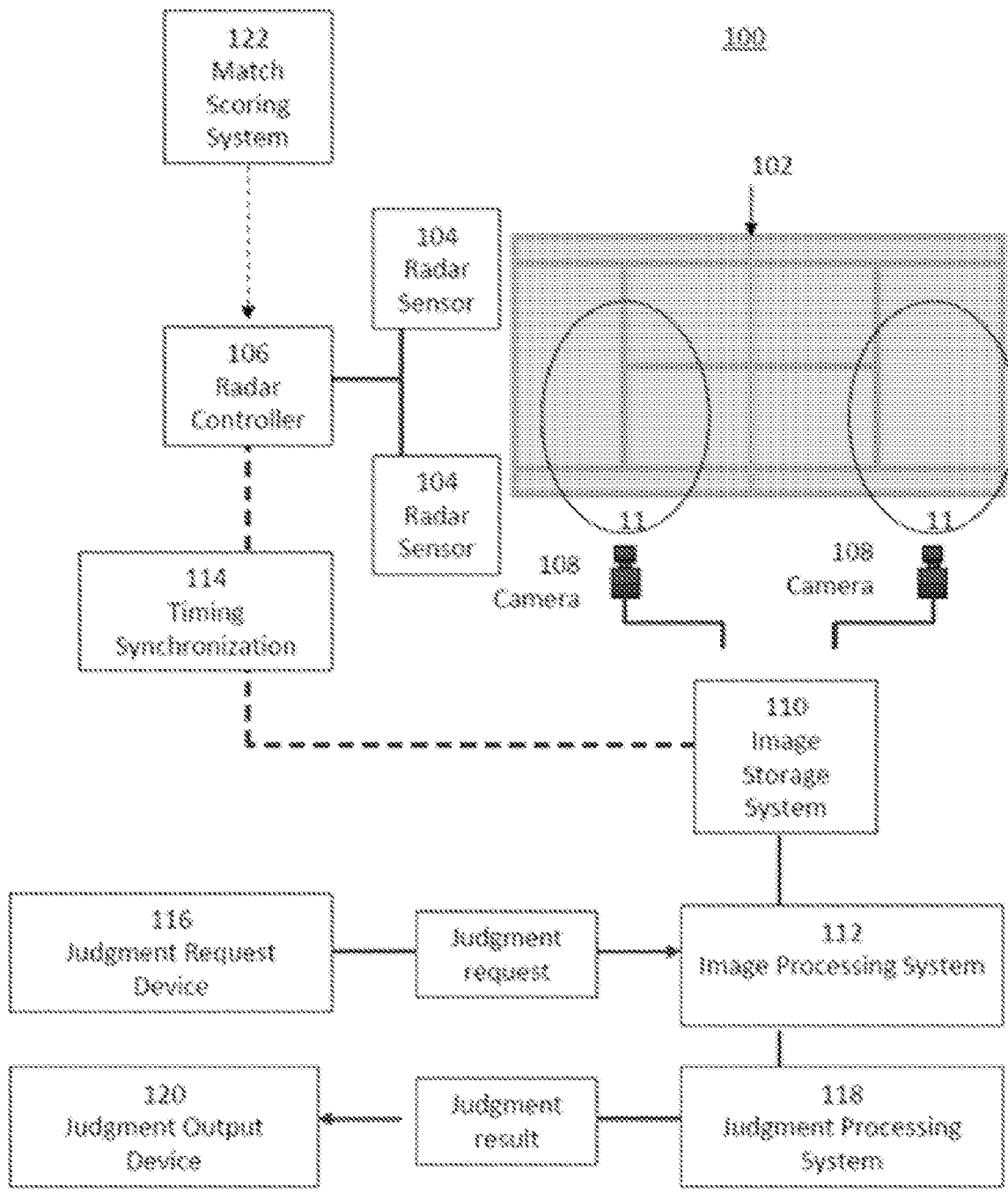
FIG. 1 is a schematic diagram of hardware comprising a system for obtaining information about a ball mark.

The following detailed description refers to the accompanying drawings. Where the same reference numbers are used in the drawings and the following description, such reference numbers refer to the same or similar components or processes. While several exemplary versions and aspects of the invention are described herein, modifications, adaptations and other implementations are possible without departing from the spirit and scope of the invention. For example, substitutions, additions and/or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

The present description relates to systems and methods for determining the position of a mark left by a ball or other object on the surface of a sports court or field. More specifically, the present description relates to systems and methods for providing information about the position of a mark left by the impact of a ball on a playing surface relative to a feature of the field or court, such as a boundary line. In particular, the disclosed systems and methods may be useful to officials overseeing sporting events and for enhancing the precision with which a ball is tracked. They may also be used to enhance coverage of sporting events by providing more detailed and accurate information regarding the event to an audience, whether via an onsite display board or marquee or remotely via media such as television or the Internet.

The disclosed systems and methods may be used to detect ball marks that are not visible to the human eye. They may be used to detect ball marks by processing a sequence of images of the playing surface taken before and after ball impact to detect changes in the optical features of the court surface caused by the impact of the ball.

For the purpose of this specification, the term "ball" can be replaced by any object that is struck or thrown in sports, including for example a puck. Additionally, for the purposes of this specification, the term "court" refers to the volume and/or surfaces that define the playing area for a chosen sport, including but not limited to a tennis court, golf course, baseball field, or a cricket pitch.

FIG. 1 is a hardware diagram for one embodiment of a ball-mark detection and measuring system 100. In this particular aspect, system 100 is applied to providing information regarding the position of impact of a ball on a tennis court 102. As mentioned above, system 100 may be applied to other sports in which the position of an object such as a ball must be judged against a physical position in the playing area such as a boundary or scoring line.

System 100 may comprise one or more radar sensors 104 that provide trajectory data for a ball in play (e.g., position in three-dimensions as a function of time). Radar sensor 104 may estimate the coordinates any impact, and may also estimate the time of impact. System 100 may comprise a radar controller 106 that selects or combines measurements from the one or more radar sensors 104. Prior to the start of play, radar sensors 104 may be set up on or near the court in position(s) where they have a reasonably clear view of the ball in play, and are not obstructed by players, officials, or structures. In one aspect, multiple radar sensors 104 may be used and placed so that players and officials will not obstruct the line of sight from all radars to the ball in play at any moment.

System 100 may also comprise one or more cameras 108 that take images of the playing surface and one or more camera controllers 109 that control and receive images captured by cameras 108. System 100 may also comprise an image storage system 110 that stores images taken by cameras 108 prior to and after the ball impact. System 100 may comprise an image processing system 112 that compares the images of the playing surface before and after the ball impact to produce an image of the ball mark on the surface. System 100 may further include a synchronizing link 114 to synchronize the timing of events between radars 104, radar controller 106, cameras 108, camera controllers 109, and other equipment connected to system 100. System 100 may further comprise a judgment request device 19 for transmitting a judgment request to image processing system 112. After receiving a judgment request, image processing system 112 may process relevant images in image storage system 110 and produce an image of the ball mark. The image showing the ball mark may also include any relevant features of the playing surface (e.g., boundary line(s) near the ball mark).

System 100 may also comprise a judgment processor 118 to further process the ball-mark image to determine if the ball mark touches a predefined feature of the court surface. In one aspect, judgment processing system 118 may be programmed with applicable rules of the sport and may be adapted to make a decision ("judgment result") as to whether the ball mark is in or out of bounds. Data relating to the judgment result, including a binary decision as to whether the ball is in or out, may be passed to a judgment output device 120. Judgment output device 120 may be, for example, a personal or notebook computer, a handheld or mobile electronic device, or an electronic display screen such as a television. In one aspect, judgment request device 19 and judgment output device 120 may be implemented on a single device. In another aspect, judgment output device 120 may simply be an audio device such as a speaker that displays a tone or simulated voice to indicate whether the ball is in or out.

Judgment processing system 118 may also make a binary decision as to whether the ball mark touches a playing-surface feature, which may also be passed to judgment output device 120. Judgment processing system 118 may also measure the distance by which the ball mark overlaps the playing-surface feature or the distance by which the ball mark missed the playing-surface feature. The distance by which the ball mark overlaps or is separated from the surface feature may also be passed to judgment output device 120. The judgment-result data may also include an image of the ball mark relative to the playing-surface feature(s).

In another aspect, image processing system 112 may make a judgment as to whether a ball is in or out each time the ball impacts the playing surface, without the need for a judgment request to be submitted by a human operator. In such versions, for example, system 100 may send a judgment result to judgment output device 120 every time a ball impacts the playing surface or, alternatively, every time a ball is judged to be out of bounds. In this case, image processing system 112 may process image sequences for each impact of the ball on the playing surface, rather than waiting to receive a judgment request.

As shown in FIG. 1, system 100 may be integrated with a match scoring system 122 that tracks the state of the game. Match scoring system 122 may be, for example, the EDH Chair Umpire Scorer available from EDH Sport Limited, of Ashford, Kent, United Kingdom. Match scoring system 122 may provide information relating to the state of the match to radar controller 106. For example, prior to the start of a point, match scoring system 122 may provide radar controller 106 with the side of the court from which the serve will originate, thereby assisting radar controller 106 in determining the origin of a serve and making initial calculations regarding the ball's trajectory. In this manner, it is not necessary for a person to manually enter the serve direction prior to each serve. Furthermore, because cameras 108 and radars 104 may be adapted to continually collect data and pass it to image storage system 110, there is no need for human interaction with system 100 during play until a request for judgment or ball-mark data is issued by an official. If system 100 is configured to generate a judgment result for each ball impact and notify an official of "out" shots, no human interaction with system 100 is necessary at all.

In one aspect, system 100 may also provide information to match scoring system 122. For example, in a version of system 100 in which judgment processing system 118 makes a determination of whether a ball is in or out, system 100 may notify match scoring system 122 of the decision so that match scoring system 122 may update the match score appropriately. Similarly, in a version of system 100 in which an official views an image of the ball mark generated by image processing system 112 to make a determination of whether the ball was in or out, system 100 may be adapted to communicate the official's decision to match scoring system 122. For example, the official may press a button indicating the decision, which may prompt judgment output device to communicate the decision to match scoring system 122.

Data may be communicated between the components of system 100 using a wide variety of electronic data networks known in the art. For example, data may be communicated using a wired network, such as an Ethernet network, or a wireless electronic data network.

In one aspect, judgment processing system 118 may not make a final determination as to whether a ball was in or out, but may instead pass the image of the ball mark relative to the playing-surface feature to judgment output device 120 to allow an official to make the final judgment. In this case, judgment processing system 118 may still pass to the official a preliminary judgment as to whether the ball was in or out and/or the distance of overlap or non-overlap of the ball relative to a playing-surface feature. In another aspect, judgment processing system 118 may be omitted altogether, and image processing system 112 may pass an image of the ball mark relative to the playing-surface feature(s) to an official to allow the official to determine whether the ball was in or out.

Figure 2:
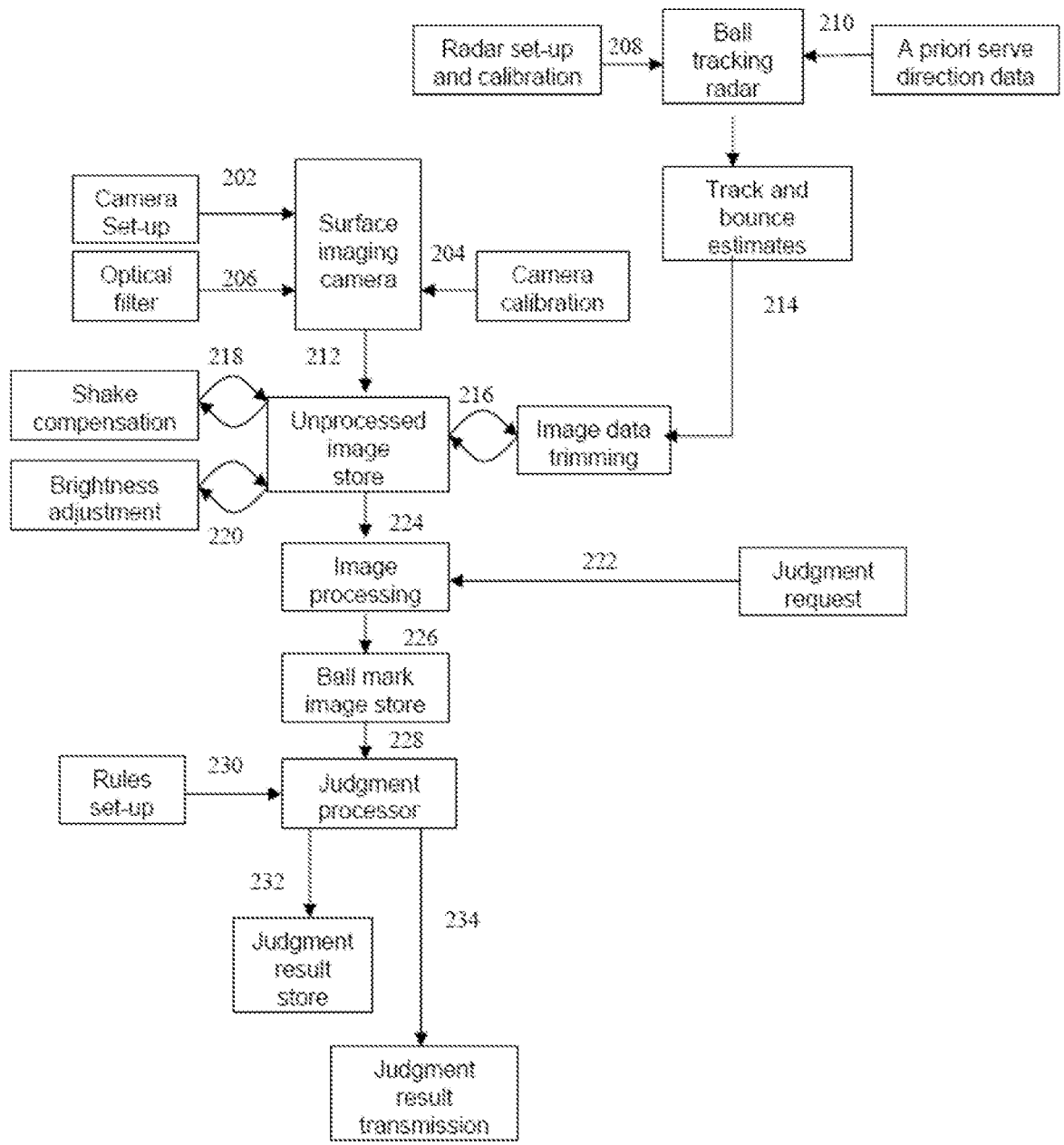
FIG. 2 is a flow diagram depicting the use of the system depicted in FIG. 1 to obtain information about a ball mark.

FIG. 2 is a flow diagram of a process for making a line-call judgment. In stage 202, one or more cameras may be set up to capture images of a playing surface. In stage 204, the camera(s) may be set up and calibrated. The calibration process may be used to determine the mapping of image picture elements (pixels) to real world coordinates. The calibration method may include temporarily placing specific markers or lines on the playing surface and/or lines and other features on the field or court and whose positions are known. These known lines and markers can then be mapped to image pixels as required. An optical filter may also be fitted on the camera(s) in stage 206 to reduce glare and enhance the contrast of a ball mark on the prevailing court surface and lighting conditions may also be fitted on the camera(s) in stage 206.

One or more ball-tracking radar devices may be set up and calibrated, as shown in stage 208. In one aspect, a Doppler simulator instrument may be used to determine the alignment of the radar devices. This may be accomplished, for example, by placing the Doppler instrument at several known positions on the court and measuring the elevation and azimuth offset angles for each radar. The measured offset angles may then be used as correction factors used in radar tracking.

As discussed above, in one aspect, the radar system may receive information regarding the a priori serve direction from a match scoring system, as illustrated in stage 210. Alternatively, this information could be manually entered into the radar system prior to a serve. In stage 212, the camera (s) may pass captured images to an unprocessed image storage system. In other aspects, the radar system may receive no information regarding the a priori serve direction. In stage 214, the radar system may send an estimated impact time and/or position to the unprocessed image storage system, which may use the estimated impact time and/or position to discard images that are not relevant to the determination of the location of the ball mark on the playing surface (stage 29).

After trimming the volume of images, the remaining images may be processed in stage 218 to compensate for slight linear and rotational displacements that may occur between successive image frames, which are potentially caused by camera vibration or movement. In stage 220, the remaining images may be processed to adjust the brightness of each image sequence to an "average" value.

In stage 222, a judgment-data request may be passed to an image processing system, which may prompt unprocessed image storage system to pass the remaining images to the image processing system (stage 224). The image processing system may process the images as described in detail below to generate an image of the ball mark relative to relevant playing-surface feature(s). After processing, the ball-mark image may be passed to a ball-mark-image store (stage 226). In versions of the system utilizing a judgment processing system, the ball-mark image may be passed to the judgment processing system (stage 228). The judgment processing system may have undergone a rules set-up (stage 250) providing it with the necessary information to make a judgment based on the state of the game. Data relating to the judgment may be passed to a judgment-data store (stage 232), and may also be transmitted to interested entities, such as the computer or handheld electronic device of an official, television-broadcast systems, Internet-broadcast systems, a display board, and/or a match scoring system (stage 234). In versions of the system omitting a judgment processing system, the ball-mark image may be passed from the ball-mark image store to one or more interested entities.

Figure 3A:
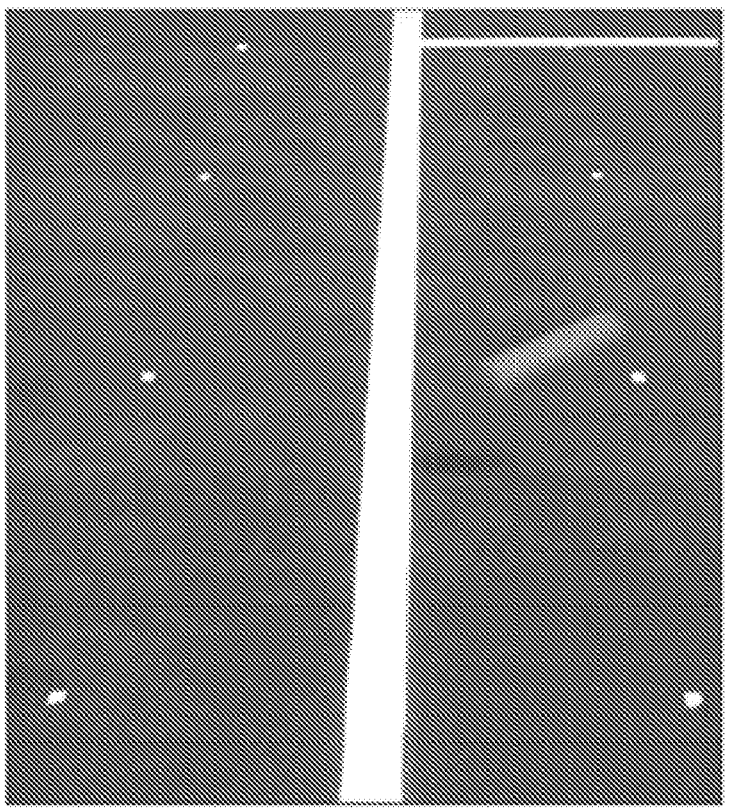
FIG. 3A is an unprocessed image of a tennis ball just prior to impact with a tennis court.
Figure 3B:
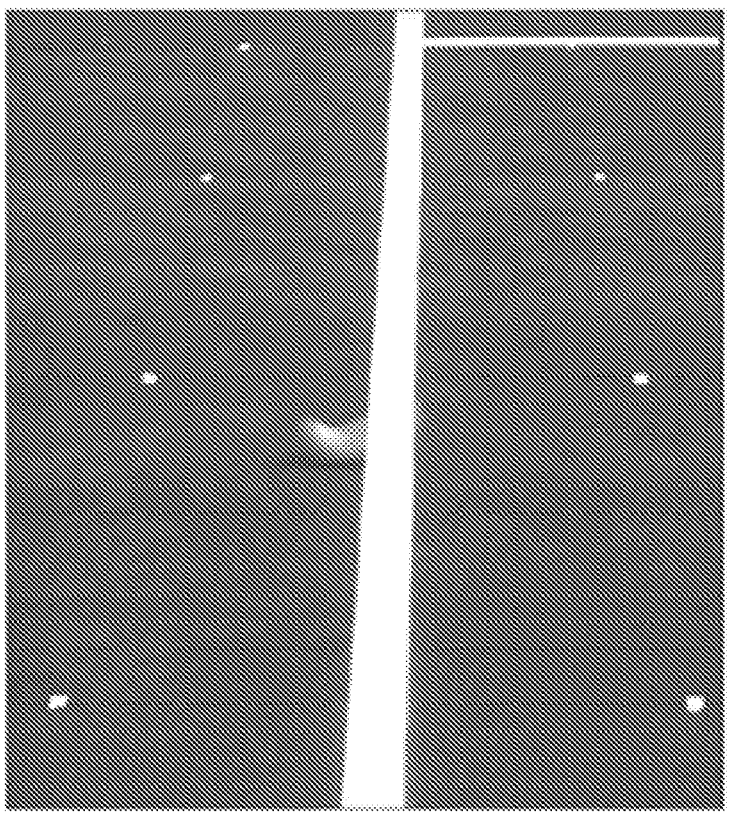
FIG. 3B is an unprocessed image of the tennis ball shown in FIG. 3A just after impact with a tennis court.
Figure 4A:
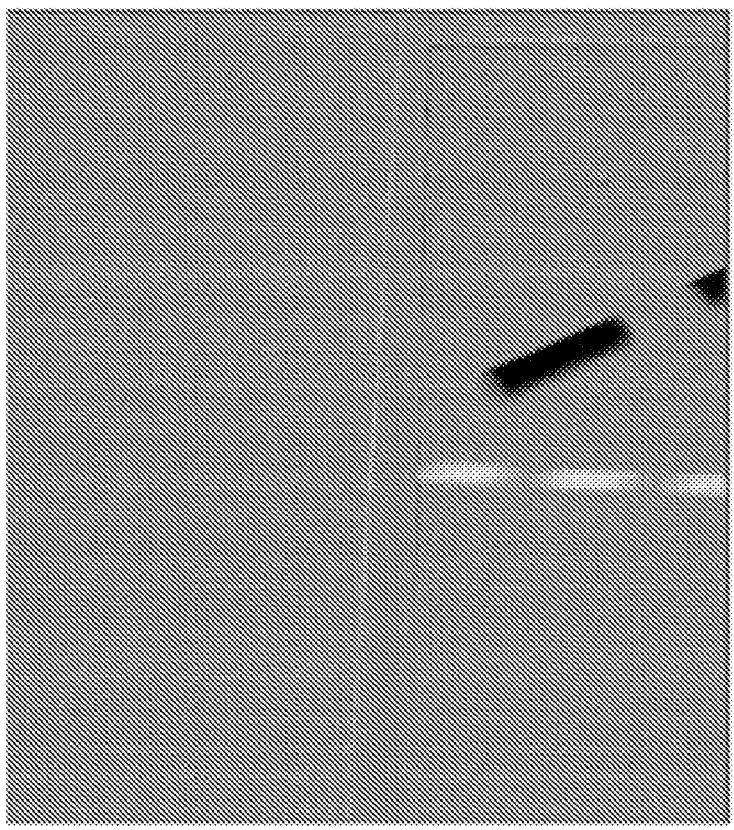
FIG. 4A is an image of the tennis ball shown in FIG. 3A just prior to impact with a tennis court processed as described herein.
Figure 4B:
FIG. 4B is an image of a ball mark left by the tennis ball shown in FIG. 3B processed as described herein.

FIGS. 3 and 4 demonstrate an application of a system and method. FIGS. 3A and 3B are unprocessed video images showing a tennis ball just before and just after impact with a tennis court, respectively. In FIG. 3B, it appears that the ball impacts the court just beyond the service line of the court. Thus, based on appearances, such a serve would be ruled out. FIG. 4A is an image of the same tennis ball traveling toward the court, but which that has been processed as described above. FIG. 4B is an image of the court after impact of the ball shown in FIGS. 3A and 3B processed as described above. FIG. 4B shows the ball mark left on the playing surface by the impact of the ball. As can be seen in FIG. 4B, the ball mark just touches the service line, and such a serve should therefore be ruled in-bounds.

While FIGS. 1-4 relate specifically to detecting a mark left by a tennis ball on a tennis court, systems and methods for detecting a ball mark as described above may be applied to other sports for officiating and other purposes. For example, the disclosed methods and systems may be applied to assist officials in making decisions during cricket matches or to detect the landing position of a golf ball in a golf tournament.

Ball Trajectory Measurement

In a variety of sports, it is desirable to track the trajectory of an object such as a ball for television display, coaching, performance measurement, and a variety of other purposes. Commercial ball-tracking systems using any technology, including but not limited to cameras and radars, will exhibit tracking errors due to noisy measurements and systemic measurement errors. Systemic measurement errors can include optical distortions in camera systems, multipath-induced errors in radar-based systems, and/or alignment offsets. Some systemic errors may also drift in time due to movements of the sensors or their mountings. The result is that sensor alignment is changed relative to its original calibrated positions.

As discussed above, a radar system can track the ball (that is, to determine its speed and position in three dimensions as a function of time) with only limited accuracy, due to noise and other distortions that will influence the measurements. However, using the ball-mark detection method disclosed herein, the above-described limitations of radar tracking may be largely corrected in near real-time. Corrections may be made by using the ball-mark position determined according to the method described herein in the calculation of the trajectory of the ball. Because of the accuracy of the ball mark relative to other image features such as lines or other structures on the playing surface, tracking errors may be reduced. Apart from the improved tracking accuracy, the corrected ball-tracking process eliminates the need for frequent recalibration of tracking sensors during major sporting events, a costly inconvenience that can only take place during breaks in play.

Figure 5:
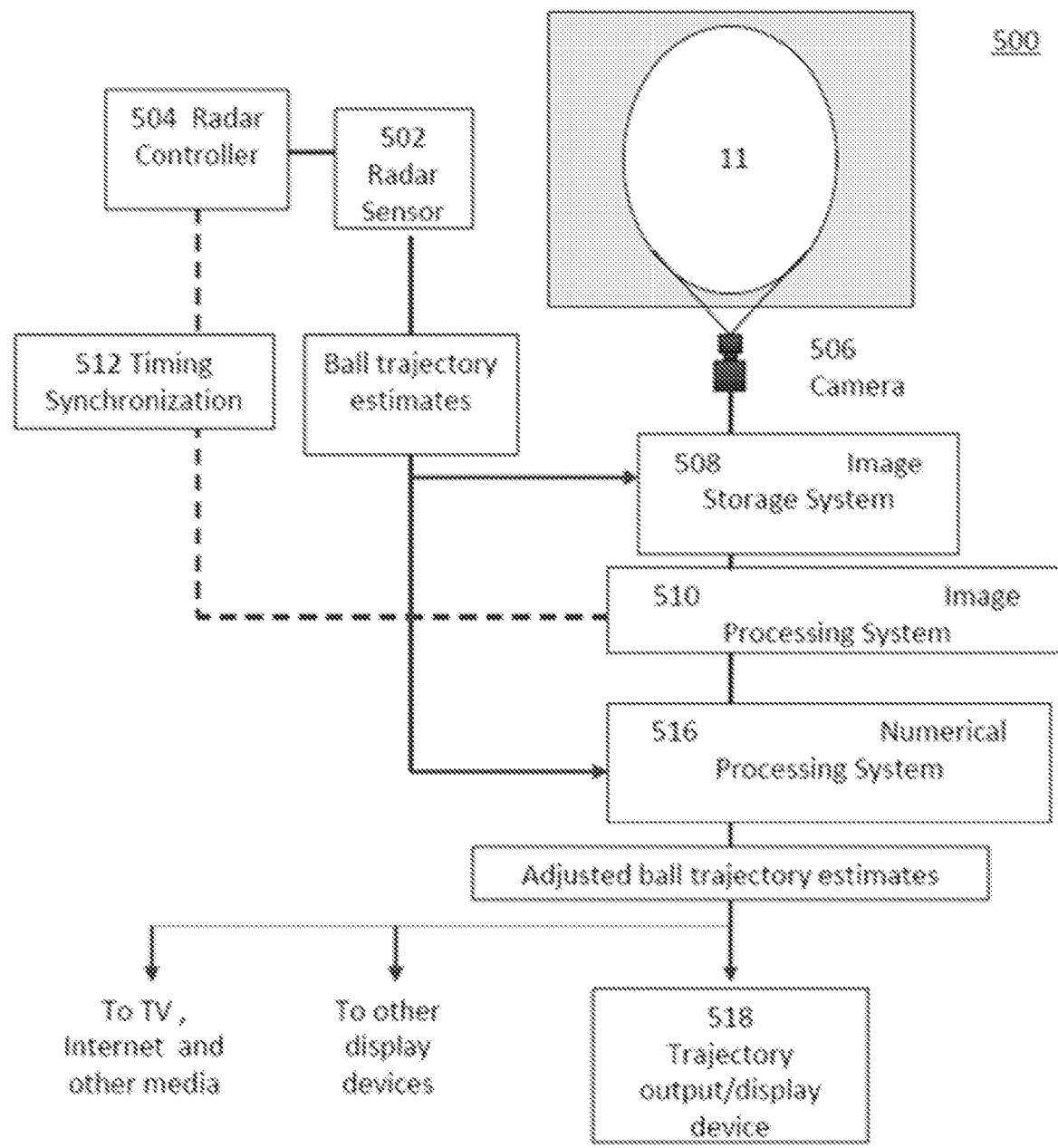
FIG. 5 is a schematic diagram of hardware comprising a system for accurate ball tracking.

FIG. 5 illustrates a hardware diagram of a ball-mark detection and measuring system 500 adapted to provide more accurate ball-tracking information than commercially available systems. System 500 may be applied to the tracking of balls in tennis and cricket, for example, as well as other sports.

Like system 100, system 500 may comprise one or more radars 502 that measure the trajectory of the ball and provide data to a radar controller 504, which may be adapted to receive and process information regarding the ball's trajectory collected by radars 502. System 500 may further comprise one or more cameras 506 set up to take images of the playing surface; an image storage system 508 that retains images taken by the cameras prior to and after the ball impact.

The images captured by cameras 506 may be initially calibrated relative to coordinates used by the radars to map the playing surface (including height above the playing surface) for purposes of ball tracking. This may be done by placing a removable grid, comprising a printed sheet with a matrix of lines, on the playing surface after cameras 506 have been installed. In one aspect, a checkered grid in which each section measures approximately 100 mm by 100 mm may be positioned on the court or field where boundary lines form a right angle. Several camera images may then be captured and processed to determine the specific linear and rotational data that relates a camera pixel position to a particular set of court surface coordinates. The grids may be removed after this step and prior to the start of play. In another instance, the fixed features of the playing surface (e.g., the lines on a tennis court) can be used as reference points for the calibration of the cameras.

System 500 may also comprise an image processing system 510 that processes the images of the playing surface before and after the ball impact to produce an image of the ball mark on the surface; and a synchronization hub 512 to synchronize the timing of events between the components of system 500. System 500 may further include a ball-mark processor 514 that processes the ball-mark image to calculate the coordinates of the ball mark on the playing surface.

System 500 may also comprise a numerical processor 59 that receives data relating to the ball trajectory from radar controller 504. Numerical processor 59 may also receive the ball-mark coordinates from the ball-mark processor 514. As discussed above with regard to FIGS. 1 and 2, the unprocessed, trimmed image data need be processed to detect a ball mark only on receipt of a judgment request in a line-calling application. However, in one aspect of a ball-tracking system, the ball-mark position may be calculated for all impacts, so that the ball trajectory may be continuously tracked.

Numerical processor 59 may calculate the coefficients of a mathematical curve that fits the ball trajectory using the ball-mark coordinates together with the radar measurements of the ball's trajectory. In this manner, system 500 uses the ball-mark coordinates to generate a more accurate ball trajectory than could be calculated by a system that merely estimates the three-dimensional location of the ball impact.

System 500 may further include an output/display system 518 that displays the radar trajectories in three-dimensional views. System 500 may also output information relating to the corrected ball trajectory (e.g., the corrected mathematical coefficients for the trajectory, static images, or animated images) to other systems, such as computer monitors, handheld electronic devices, television monitors, TV-broadcast systems, or an Internet-broadcast system.

Figure 6:
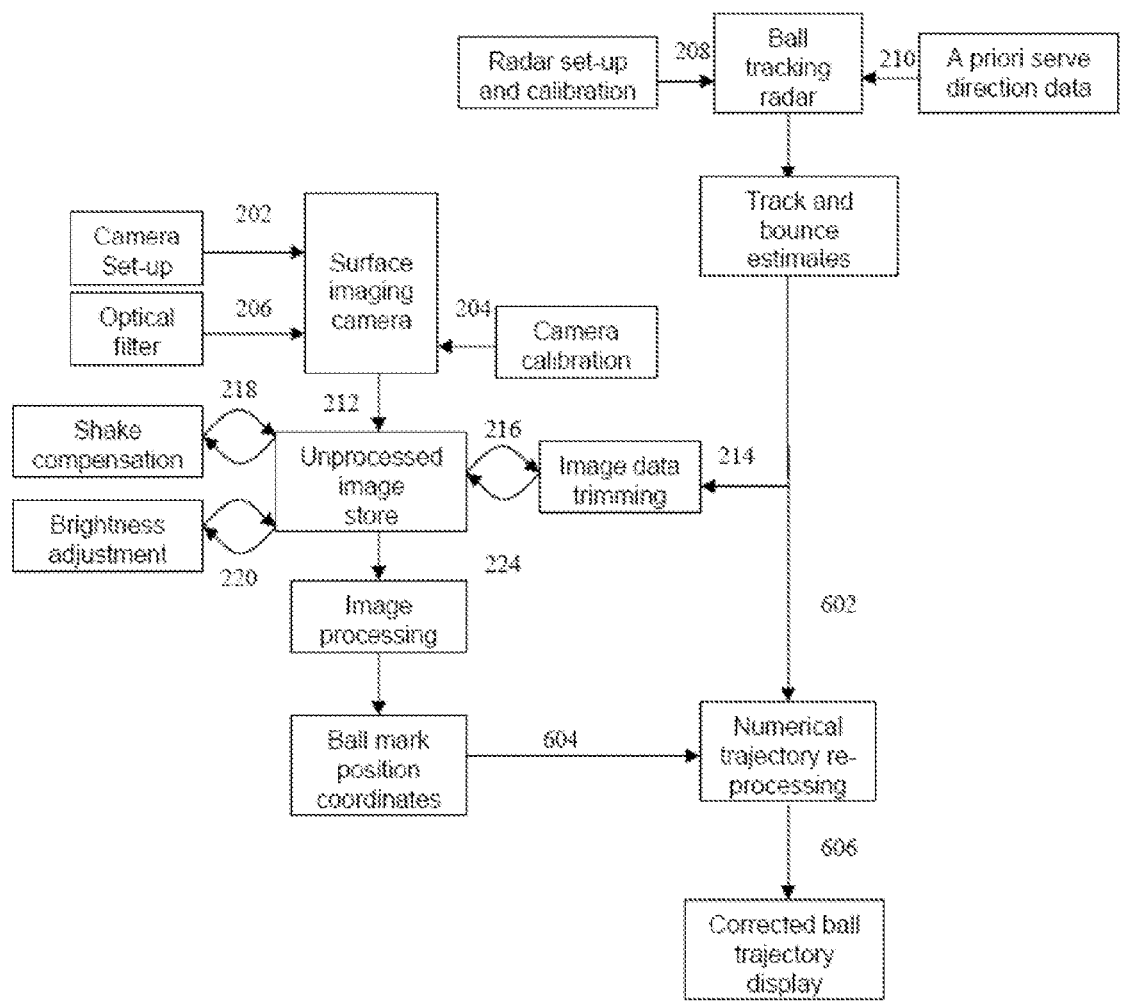
FIG. 6 is a flow diagram depicting the use of the system depicted in FIG. 5 to obtain ball-tracking data.

FIG. 6 is a flow diagram depicting the process of producing an accurate ball trajectory using the ball-mark position and trajectory information collected by a radar system. Stages 202-220 and 224 were described above with reference to FIG. 2. As shown in stage 602 of FIG. 6, estimated ball trajectory and impact information generated by the radar system may be passed to a numerical processor. In stage 604, the coordinates of the ball mark determined according to the principles discussed herein may be passed to the numerical processor. Based on the ball-mark position coordinates, the numerical processor may re-calculate the estimated ball trajectory determined by the radar system and generate improved ball trajectory data. As depicted at stage 606, a ball trajectory display may be generated based on the improved trajectory information calculated by the numerical processor.

Figure 7:
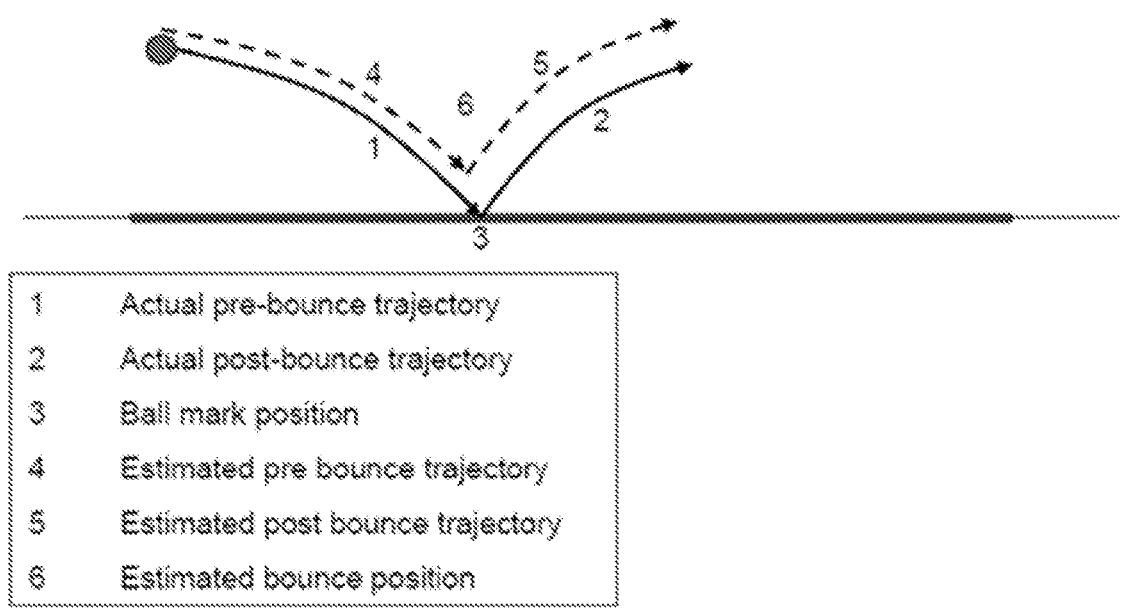
FIG. 7 is a diagram illustrating the flaws of currently available commercial systems for tracking ball trajectories.

FIG. 7 illustrates how an estimated trajectory of a ball can differ from the actual trajectory. Lines 1 and 2 show the actual trajectory of a ball prior to and after an impact 3 with a playing surface. Lines 4 and 5 show an estimated trajectory similar to that generated by many commercial systems. Estimated trajectories are often inaccurate, due in part to errors in the estimated impact point of the ball on the playing surface. For example, as shown in FIG. 7, commercial systems may utilize an estimated impact point 6 that is spaced in one or more dimensions from an actual impact point 3. As illustrated in FIG. 7, errors in the estimated impact point may lead to inaccuracies in the estimated trajectory. By using the actual ball-mark coordinates identified according to the principles of the present invention in combination with trajectory data collected by a radar system, the ball trajectory may be more accurately calculated and displayed.

Radar System

In one aspect, the radar system may comprise at least one FlightScope® Doppler field disturbance sensor, for example the FlightScope® 3D Doppler tracking radar. In one aspect, the sensor may operate in a license-free band, including for example (i) 10.5-10.55 GHz frequency band with effective isotropic radiated power of 500 milliwatts or less; or (ii) 24.05-24.25 GHz band with effective isotropic radiated power of 100 milliwatts or less. The radar system may also be configured with a transmit antenna gain and a receiver antenna gain of 17 dB. In one aspect, the radar system may comprise 3 channels. Further, receiver antennas may be grouped to form a pair of antennas for elevation angle measurement and for azimuth angle measurement by means of, for example, phase or time of arrival comparison.

In one aspect, 4 to 6 radars may be mounted approximately 3 feet above the playing surface and pointed horizontally relative to the playing surface. In a further aspect, radar sensors may be aligned such that their relative positions to the court are known. The relative position may include the following information:

height of the radar above a datum point on the court surface;

pointing direction in the horizontal plane relative to the datum point;

pointing direction in the vertical plane relative to the datum point; and horizontal distance to the datum point.

Continuing with the tennis example, when a ball is served or played, all radars with a clear view of the ball may be adapted to measure the ball's apparent velocity, elevation and azimuth angles relative to the respective radars.

From the radar perspective, the ball may be tracked in spherical coordinates (d, θ, Ø) where:

d is the radial distance from radar to ball;

θ is the elevation angle from radar to ball; and

Ø is the azimuth angle from radar to ball.

For a serve, the origin of the ball may be calculated as follows:

$$d_0 = \sqrt{(x_0^2 + y_0^2 + (z_0 - z_r)^2)}, \text{ where:}$$

$d_0$ is the distance of ball origin from radar;

$x_0$ is the distance from radar to service line;

$y_0$ is the radar offset from center line;

$z_0$ is the average height of a served ball above the service line; and $z_r$ is the height of the radar above the court surface.

The radars may measure the values θ and Ø of the ball directly, taking samples of the directions at a rate of nominally 10,000 per second.

The distance from the radar to the ball may be determined by measuring the apparent (radial) velocity ($v_r$) of the ball relative to the radar, followed by performing numerical integration of the following integral function that relates distance to velocity:

$$d = d_0 + \int v_r \, dt$$

where:

d is the radial distance at an arbitrary time t;

$d_0$ is the radial distance of origin of trajectory; and $v_r$ is the measured radial velocity of ball.

The radial distance, elevation angle and azimuth angle define the ball's position in space relative to the radar in a spherical coordinate framework. The position of the ball can be restated in other coordinate systems or frames of reference as needed by simple numerical transformations. In general, a traveling ball follows a path determined by its initial launch conditions (e.g., origin, velocity, spin, and direction) and the effects of external forces (notably, gravity, drag, and spin-induced). More information regarding this subject can be found in Chapter 22, Formulas from Vector Analysis: Special Orthogonal Coordinate System, *Mathematical Handbook of Formulas and Tables*, incorporated herein by reference. Spiegel, Murray R. *Mathematical Handbook of Formulas and Tables*. Schaum's Outline Series, McGraw-Hill, 1968.

The radar may use the measurements of the initial part of the ball's flight path to construct a numerical description of the ballistic flight path of the ball. The ballistic model may be a simple curve fit, or may be a more complex model that includes the forces of gravity, spin and air friction (drag), and that approximates the ball flight path as accurately as needed. Using the model, the position of impact of the ball on the court as well as the time of impact can be calculated to a degree of error too large for making line-call decisions directly, but accurate enough to be used to trim the volume of image data to only retain images taken immediately before and after the time that the ball impacts. In this manner, the amount of image data that must be stored and processed to determine the mark of the ball impact may be reduced substantially.

The ball-tracking method may be used to track balls in tennis, cricket, and other sports in which it is desirable to track the trajectory of an object. Furthermore, while the ball-tracking system described in FIGS. 5 and 6 depict a radar system collecting initial trajectory data that is improved using the ball-mark detection method, the ball-tracking method disclosed herein may also be utilized with systems using other technology to gather initial trajectory data, including but not limited to cameras. In such case, radar 502 and radar controller 504 shown in FIG. 5 may be replaced with a ball-tracking sensor and controller that transmits collected trajectory information to numerical processor 59.

Combining Measurements of Multiple Radars to Determine Ball Impact Position and Time In one aspect, measurements from multiple radars may be combined to determine the approximate position and time of the ball impact. This information may then be provided to the image processing system. As described above, multiple radar units may simultaneously track a ball in play. In one aspect, radars may use the Doppler method to measure the velocity of the moving ball. Additionally, an antenna array may be used to measure elevation and azimuth angles relative to the radar's point direction.

In some aspects, the trajectory of a ball may be determined by combining measurements from more than one radar. This may be advantageous in certain instances when a given radar may not be able to resolve the position of the ball in real-world coordinates. This may occur, for example, when initial conditions, such as the starting position of a ball when launched or served, are not known. In some aspects, at least two determinations may be made by combining measurements from multiple radars: i) the time of an impact; and ii) the position of a ball at the time of impact.

In one aspect, the radars may provide a time of ball impact. The time may be determined, for example, by detecting sudden changes in the measured velocity of a ball, which may indicate the ball's movement has been affected, for example, by hitting an object or surface. The impact of a ball on a playing surface represents one instance that may produce a sudden change in velocity. In some aspects, therefore, to detect the moment of an impact, the sequence of speed measurement samples taken by any radar may be numerically differentiated.

The differentiated sequence may exhibit an impulse at the moment of the change in speed. Such an impulse, may be detected, in one aspect, by comparing the differentiated speed sequence to a set threshold value. This threshold value may be made adjustable to balance the reliability of detection against sporadic impulses that may also occur in the measurements due to measurement noise and uncertainty. Provided the differentiated sequence may be stored in an array, for example, the index of the measurement sequence where the speed change occurs may indicate the time of the ball impact.

In another aspect, measurements from multiple radars may be combined to measure the position of a ball at an impact moment. This may be accomplished, in one aspect, using a triangulation method. As noted above, radars may be located at known positions and pointed in known directions around the court or playing field. Each radar may measure the direction of a moving ball relative to the radar in elevation and azimuth angles, with the measured direction changing dependent on the ball trajectory relative to the radar's position and pointing direction. In one aspect, each radar may provide a measured direction at any instant, the direction being an angle in three-dimensional space. In a polar coordinate system, for example, the direction may be defined by the simultaneous azimuth and elevation angle components.

Figure 8:
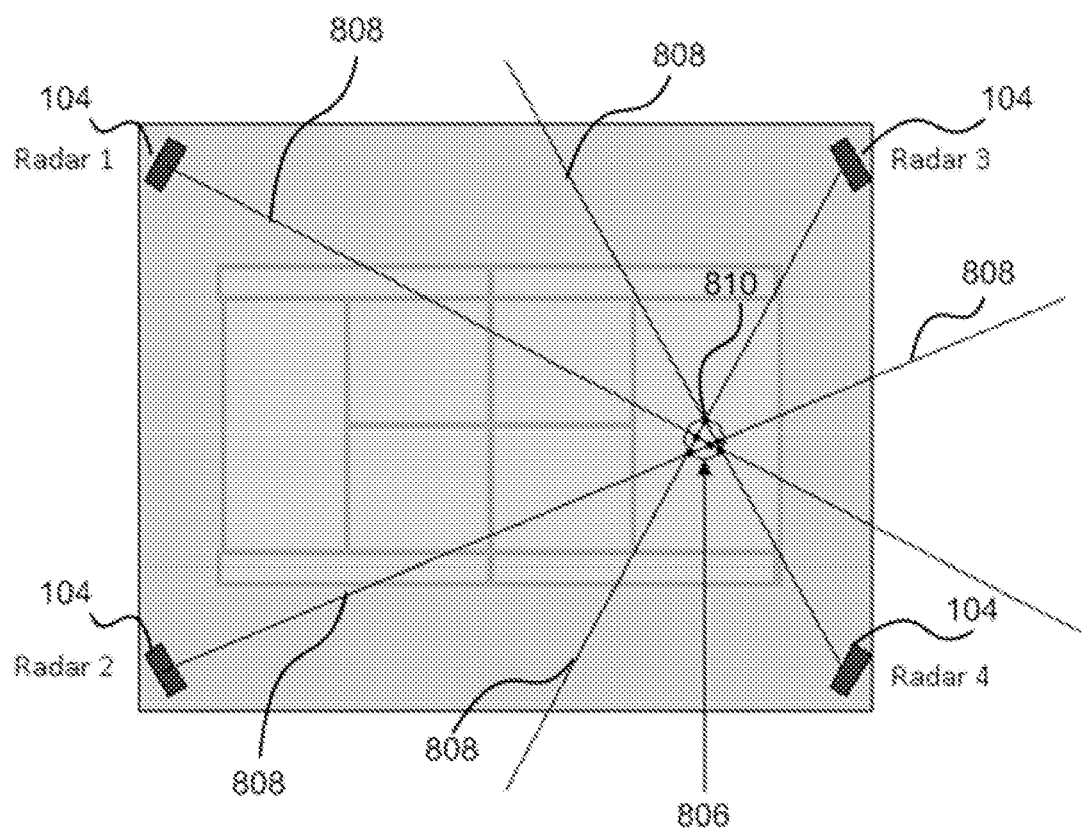
FIG. 8 illustrates an exemplary technique for determining a ball impact position using measurements from multiple radars.

In a further aspect, measurements from multiple radars may be combined to approximate a ball position at the moment of impact. FIG. 8 illustrates an exemplary technique that uses a direction measurement to a ball relative to a radar from each of multiple radars at the moment of impact. As shown, four radars 104 may be positioned so that the measured directions create six points of intersection at the moment of impact. For example, intersection 810 marks the point at which the measured directions of radars 3 and 4 cross for the given moment of ball impact. Multiple intersection points, such as those illustrated in FIG. 8, may arise when noise and measurement uncertainties cause the intersections from multiple radars to be scattered, rather than aligning at a single point.

In some aspects, fitting a sphere around all intersection points may be used to approximate the position of impact. Referring again to FIG. 8, the smallest sphere 806 that contains all six intersection points created by the measurement directions provided from radars 104 has been fitted around the six intersection points. The center of this smallest sphere 806 may therefore serve as an approximation of the ball position at the moment of impact.

Imaging of the Court Surface

As described above, one or more cameras may be placed alongside the court in a way that allows a view of those areas of the court that are of interest, such as the areas around the lines of the tennis court. In one aspect, the system may include 8 to 12 cameras elevated to a height that practically achieves a view the court surface. This height may be determined, for example, by mounting the cameras to allow a downward looking slant angle of approximately 30 to 45 degrees relative to the horizontal.

In one aspect, the camera may be a high-sensitivity commercial monochrome digital camera, such as, for example, those available from Pantera, or Dalsa. In one aspect, the camera may have a resolution of 1000×1000 pixels or better, and may have a frame rate on the order of 8 frames/second or better. The camera may also possess 10/12 bit resolution or better. In one aspect, the cameras may be set up to provide a resolution of less than 3 mm/pixel. The camera may include a data interface such as, for example, Cameralink®; gigabit ethernet (GbE); or universal serial bus (USB). The camera lens may have a range of 80-200 mm, and its magnification may be selectable and adjustable to suit the application. The cameras may also be equipped with lenses that can zoom in to the areas of interest from wherever they are located. In one aspect, the lenses may be fitted with optical filters that reduce glare and enhance the contrast of a ball mark on the prevailing court surface and lighting conditions.

The cameras may continually collect images of the court surface area at the set frame rate, and deliver the digital images to the systems for storing and processing the images. For the purposes of further discussion, the images collected and stored in this way may be referred to as "unprocessed image data."

Unprocessed Image Storage, Data Trimming, and Pre-Processing

An unprocessed image storage system, or "image store," such as a personal or notebook computer, may be dedicated to receive and store the unprocessed image data. In one aspect, the image store may be adapted to overwrite the oldest data with the latest data, thereby maintaining a record of images only for a limited time. For example, data may be overwritten after several seconds. As described in detail below, a certain amount of pre-processing may be done on stored images to balance the intensity of the images and to remove effects of vibration and shaking of the camera(s).

The storage system may also receive tracking data from the radar system, such as the estimated coordinates on the court surface of a ball impact and/or the estimated timing of the impact from the radar system. A further process, which may be referred to as "trimming," may then be performed. In the trimming process, images received from cameras that do not overlap with the estimated ball impact position and/or time may be purged (i.e., discarded or erased) from the storage system. The purging process may ensure that a sequential record of images will begin a number of frames $N_x$ before the estimated ball impact movement and up to a number of frames $N_y$ after the estimated ball impact moment. The values $N_x$ and $N_y$ may be selected to match the storage and image processing systems' capacity and performance.

The capacity of the storage system may be sufficiently large such that image sequences that could be expected to undergo further analysis (e.g., to make a line call judgment or be broadcast to media) are retained. For example, the most recent 8 impact image sequences may be retained.

In one aspect, the image store system may be a commercially available personal computer or notebook computer. The computer may include, for example, an Intel dual core processor, 4 gigabytes of random access memory, a 600 gigabyte hard drive, and Microsoft Windows XP Pro with service pack 2.

Shutter Balance Adjustment

After trimming (the process to reduce the image data volume), the remaining unprocessed image data may be processed to adjust the brightness of each image sequence to an "average" value. This process need not add or subtract any information to the image data, but may be performed to provide a constant brightness level for the images when displayed, notwithstanding the prevailing ambient light conditions. The intensity balance may adjust the average intensity of the images, which may fluctuate due to long-term and short-term fluctuations in the ambient lighting conditions.

Shake Compensation

After trimming, the remaining unprocessed image data may be processed to compensate for potential small linear and rotational displacements that may occur between successive image frames, which are potentially caused by camera vibration and movement.

As part of the shake compensation, each image in the sequence may be processed to estimate the degree of lateral and rotational displacement of each image frame relative to a reference image (which could for example be the first image of the sequence). Linear and rotation transformations may be performed on each displaced image to remove the apparent displacements. The corrected image sequence may be stored in the unprocessed image storage system.

Time Synchronization

The timing of processes and events between the radars, cameras, and other equipment that constitute the system may be controlled or synchronized. This timing enables images captured by the cameras to be time-synchronized to radar measurements. In one instance, the radar controller may generate a timing impulse or signal that is synchronous with any measurement of the ball trajectory. This timing impulse or signal may be transmitted to the cameras as a voltage transition through an electrical connection, the occurrence of a measurement event signaled by a voltage transition on the connection.

Judgment Request

As described above, systems and methods for detecting a ball mark as described herein may allow a line judge or other entity to request information relating to the impact of a ball on a playing surface. The request may be transmitted by computer hardware, software, and/or firmware, such as by an electronic signal transmitted through a wired or wireless communications network. By way of illustration, judgment and/or ball-mark data can be requested by a person pressing a button on the screen or keyboard of a personal computer (PC) connected to the system by an Ethernet data network. In this example, when the designated button is pressed, the PC may send a message using Internet protocol to the image processing system to initiate processing of the impact-image sequence. In another aspect, judgment data may be requested by a person pressing a button on the screen or keypad of a handheld electronic device connected to the system by a wireless data network.

Image Processing System

The image processing system may be used to process images to enhance changes in optical characteristics of the playing surface that result when an object impacts the surface. Such changes in the optical characteristics of the playing surface may be the result of one or more of a variety of consequences of ball impact, such as, for example, (i) deposits of particles from the object on the playing surface during impact; (ii) rearrangement of particles present on the playing surface; (iii) disturbance of liquid or solid films present on the playing surface; or (iv) abrasion of the surface from the ball impact and skid.

The image processing system may be an event-driven system that is idle until it receives a request to process a sequence of images. After receiving the "judgment request" message or signal, the image processing system may access the unprocessed image sequence from the image storage system. The image processing system may then perform a variety of processing on this data sequence to generate an image of the ball mark on the playing surface.

In one aspect, the image processing system may use the following processing procedure to detect and measure a ball mark. First, the image processing system may determine the court or field boundary lines in the images by detecting light and dark areas in the images. This determination may assume, for example, that boundary lines are lighter than the in-bound playing surface, or vice versa. Line masking may then be applied to the images so that further ball mark processing takes place only on portions of the image outside of the boundary lines. Then, the processing system may create difference images to expose the ball mark. These difference images may then be normalized by adjusting intensity values so that the average pixel intensity falls near the middle of the dynamic range of possible intensity values of the image.

In some aspects, binary thresholding may then be performed to create a corresponding image comprising light and dark areas. Blob detection may then be performed in order to identify a single blob on which to perform further processing. In this aspect, blob detection may comprise processing the image to locate areas where a substantial number of pixels are grouped. Once such areas are identified, the processing system may further select only blobs between, for example, 80 and 1000 pixels for further processing.

In a further aspect, blob detection may be followed by an ellipse-fitting procedure, in order to create an ellipse object that may be readily compared to the court or field boundary lines for a judgment decision. In some aspects, this procedure may be constrained by the direction of ball travel, which may be provided by the radar system. An ellipse may be fitted to the blob by creating a series of ellipses of various sizes and comparing each with the blob to determine a best fit. In some aspects, the ellipses may have a partial rather than full elliptical shape. The best-fit ellipse may then be compared to the court or field lines boundaries for a judgment decision.

In certain versions, such as a system that includes a ball-tracking component, the image processing system may process images relating to each impact of an object on the playing surface, rather than waiting for a request to process a sequence of images.

For example, the image processing system may filter out short duration fluctuations in the image sequence. This process is intended to eliminate or reduce the prominence of unwanted, short-lived features that may occur in the images, such as shadows or players moving through the camera's field of view. The method of filtering may be a nonlinear process such as the discrete pulse transform (DPT). More information on the DPT can be found in Chapter 9, "The Discrete Pulse Transform," Nonlinear Smoothing and Multiresolution Analysis, incorporated herein by reference. Carl Rowher. *Nonlinear Smoothing and Multiresolution Analysis*, $1^{st}$ Ed. Birkhaeuser Basel, 1999, ISBN013: 978-3764372293. The discrete pulse transform may transform the time-changing value of a particular picture element (e.g., pixel) into a set of orthogonal data vectors. The DPT may be used to map the spurious and transient image features to high-frequency (fast-varying) data vectors. Regular image features may be mapped by comparison to low-frequency (slowly varying) data vectors. Filtering may be performed by removing the high-frequency components from the set of data vectors, after which the inverse discrete pulse transform may be performed on the remaining data. This filtering process may be applied to produce a time series of the pixel in which the spurious image feature has been removed. This process may be repeated for all pixels in the image, producing a sequence of images in which the spurious or transient feature has been suppressed.

The image processing system may also perform averaging of successive image frames to reduce random noise caused by thermal noise or other electronic interference, such as electronic circuit switching, a phenomenon inherent in cameras and other electronic sensor systems. The averaging process may comprise a summation of the value of every pixel for a number of successive frames. A number of images around the estimated moment of impact may be excluded from the averaging process to retain the pure pre- and post-impact images. A number of images (e.g., 2×k, k typically being between 5-10) around the estimated moment of impact may be excluded from the averaging.

To calculate the averages, a number ($n_1$) of images "before" the impact moment, but excluding a number (k) of images immediately before the estimated moment of impact, may be added together. In one aspect, the value of $n_1$ may be between 10 and 100 to provide a balance between processing speed and noise-reduction performance. This summation may be termed Image "B" (i.e., the before image). Similarly, a number ($n_2$) of images "after" the impact moment, but excluding the first k images after the estimated moment of impact, may be added together. Like $n_1$, $n_2$ may, in one aspect, be between 10 and 100, and may equal $n_1$. This summation may be termed Image "A" (i.e., the after image).

The image processing system may also perform differencing to obtain an image of the ball mark. The differencing process may obtain the ball-mark image by subtracting Image "A" from Image "B." This differencing produces a differenced image containing the ball mark left by the impact of the ball on the playing surface. Alternatively, the differencing step may be performed on the sequence of images without the averaging step having been performed, although performing differencing in this manner may require more processing during the differencing stage. Similarly, differencing may be performed without filtering out short-duration fluctuations, although additional processing may be needed to distinguish the ball mark from short-duration fluctuations. The sequence of filtered images and the differenced images may be stored for further processing and display.

While the human eye can distinguish only between about 30 and 50 shades of a color, typical digital cameras recognize 256 shades of a color. Typically, the ball mark will not be a different color from the playing surface, but will instead be a slightly different shade of the same color. Often, the distinction in shade between the mark and the playing surface is so slight that the human eye cannot recognize it. Once an image of the ball mark is identified through the differencing process, the distinction in shade between the playing surface and the ball mark can be emphasized using standard computer imaging techniques so that the ball mark becomes visible to the human eye in a processed image.

In one aspect, the image processing system may be based on a commercially available personal or notebook computer. The computer may include, for example, an Intel dual core processor, 4 gigabytes of RAM, a 600 gigabyte hard drive, and may run Microsoft Windows XP Pro with service pack 2.

Rule Set-Up

Systems for detecting a ball mark as described herein may allow an operator to set up the rules of the sport (e.g., tennis) in a form that the judgment processing system can use. For example, the rules set-up may include a numerical value that specifies the amount of overlap between the ball mark image and the line image that corresponds to a ball having touched the line. Likewise, the rules set-up may indicate which direction adjacent a surface feature is in bounds and which direction is out of bounds. The rules set-up may also indicate which surface features are relevant in particular situations. For example, in a tennis match in which the score of the current game is deuce, the rules set-up may indicate to the judgment processing system that the next serve must fall within the service box on the deuce side of the court. If the current match is singles, the rules set-up may indicate that the relevant surface features for any rally following a serve are the singles lines. Likewise, if the match is doubles, the rules set-up may indicate that the relevant surface features for any rally following a serve are the doubles lines.

Judgment Processing System

The judgment processing system may operate on the image of the ball mark generated by the image processing system. For example, the judgment processing system may compare the image of the ball mark with the image of the line to determine whether or not the ball touches the line. The judgment processing system may perform edge detection and curve fitting on the image data to detect and delineate the position of the ball relative to features of the playing surface such as boundary lines. Edge detection may be used to mark points in a digital image at which the brightness changes sharply. In the case of a ball mark, the brightness changes sharply on the perimeter of the area of contact between the ball and the surface. More information on edge detection can be found in Marr, D. and Hilreth, E., "Theory of Edge Detection," *Proceedings of the Royal Society* Vol. B 207, pp. 187-218 (1980), incorporated herein by reference.

Curve fitting may be used to find a curve that best matches the mark found by the edge-detection process. The best curve may be the curve that has the smallest overall error between the curve coordinates and the mark. For a mark made by a tennis ball, one possible curve that may be fitted is an elliptical shape. More information on curve fitting may be found in Fitzgibbon, Andrew; Pilu, Maurizio; and Fisher, Robert B., "Direct Least Square Fitting of Ellipses," Pattern Analysis and Machine Intelligence Vol. 21, No. 5 (May 1999), incorporated herein by reference. The statistical method of regression analysis may be used in matching a curve to the perimeter of the ball mark. The fitted curve may be used as a simpler representation of the ball-mark position and perimeter in further processing and calculations.

Based on the detected position of the ball mark relative to the relevant surface feature(s), the judgment processing system may apply the rules as specified by the rule set-up to determine if the ball touches the line, which may be a binary decision (i.e., yes or no). In addition, the judgment processing system may calculate the distance of overlap, or non-overlap, between the ball mark and the relevant playing-surface feature, as well as the direction of the non-overlap (i.e., whether the ball was inside or outside the relevant boundaries). The judgment data may be stored for future reference, and may also be transmitted to one or more systems for display. For example, the judgment data may be transmitted to a device for display to an official overseeing the game. The judgment data may also be transmitted to other systems or devices, such as to television media, a display board visible to onsite fans, or over the Internet.

Numerical Processor

The radar may determine the ball trajectory by measuring the instantaneous radial velocity, elevation, and azimuth angles of the ball, and by tracking its position coordinates based on an assumed trajectory origin (e.g., a serve position). As described above, in any practical situation, the measured trajectories will be inaccurate due to measurement noise and sensor offsets. In one aspect, the numerical processor may use the measured ball mark positions to correct the initial radar trajectory estimates as follows: (i) the initially measured trajectory of the ball may be expressed as a mathematical curve, by fitting a multiple-order polynomial to the measurements; and (ii) using the ball-mark position coordinates, the now-known actual position of the impact point may be used to recalculate the coefficients of the curve based on this additional information.

While a number of separate systems have been referred to herein, it is understood that each of these systems need not be implemented on separate devices. For example, image storage system 110, image processing system 112, and judgment processing system 118 shown in FIG. 1 may be implemented on a single computer. Radar controller 106 may also be implemented on the same or a different computer from image storage system 110, image processing system 112, or judgment processing system 118. Likewise, judgment request device 19 and/or judgment display device 120 may also be implemented on the same or different computers as one or more of the other systems described in FIGS. 1-4. Further, the numerical processor may be implemented on the same device as one or more of the systems described in connection with FIG. 1.

A computer system may be used to implement systems and methods for detecting a ball mark and/or for generating improved ball-tracking data. The computer system may be a computer network, as shown in FIG. 9, or a stand-alone personal computer (PC) interfacing with the other hardware components such as radar sensors and cameras, as shown in FIG. 10.

Figure 9:
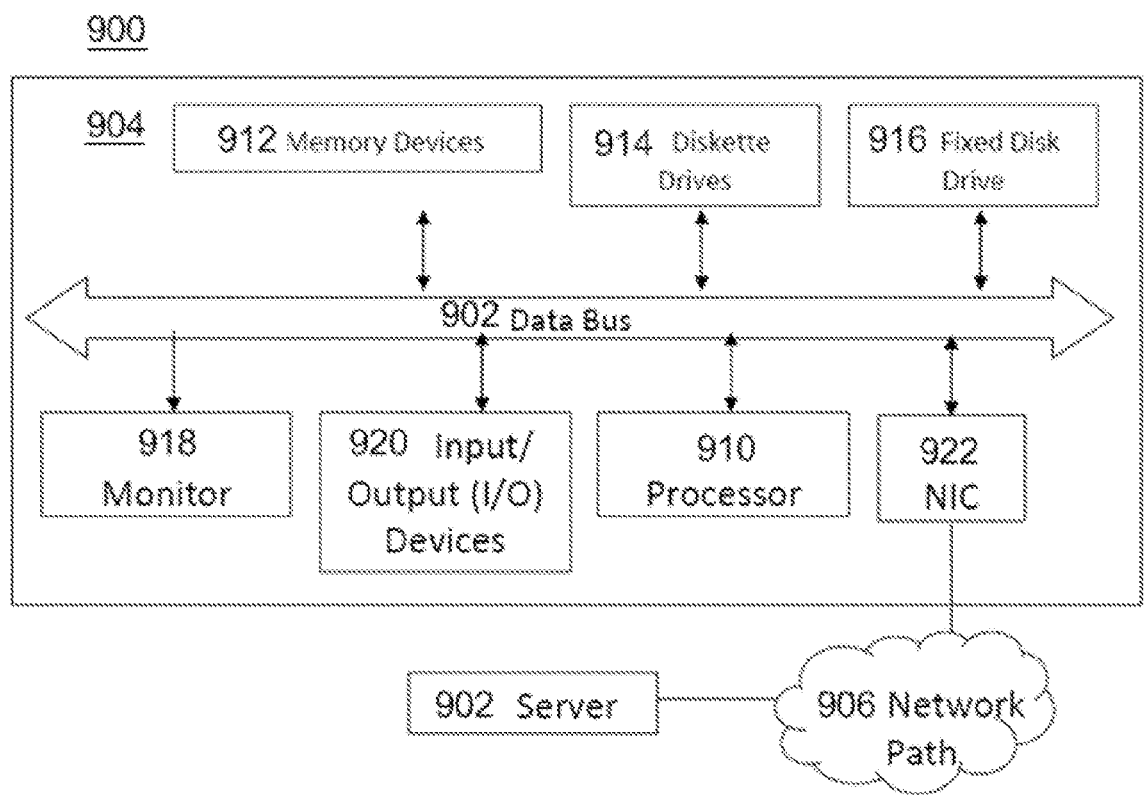
FIG. 9 illustrates a computer system for implementing software applications.

As shown in FIG. 9, a computer network 900 for implementing systems and methods for detecting a ball mark and/or for generating improved ball-tracking data as described herein may include a server 902 and a stand-alone PC 904 connected through a network path 906. Computer network 900 may be a local area network (LAN), where server 902 and PC 904 are workstations. Computer network 900 may also be the Internet, with server 902 hosting a web application and PC 904 being any workstation available to a user desiring to interface with the application on server 902. Alternatively, computer network 900 may be a wide area network (WAN), and server 902 and PC 904 may lie in two separate LANs connected through the Internet. PC 904 may include a bus line 909 connecting a plurality of devices such as a processor 910, memory devices 912 for storage of information, diskette drives 914, a fixed disk drive 916, a monitor 918, other I/O devices 920, and a network interface card (NIC) 922. Processor 910 may be a microprocessor such as an Intel Pentium™ chip for processing applications. Memory devices 912 may include read-only memories (ROM) and/or random access memories (RAM). Diskette drives 914 may include a floppy drive and/or a compact disk (CD) drive. Fixed disk drive 916 may be a hard drive. I/O devices 920 may include a keyboard and/or a mouse for receiving input from a user of PC 904. Monitor 918 may display output from processor 910, and may also echo the input of the user. PC 904 may be connected to network path 906 through NIC 922.

One or more applications may be installed on server 902. The application on server 902 may be accessed using a web browser loaded on PC 904, and may communicate with server 902 through NIC 922 and network path 906. In one aspect, applications implementing systems and methods for detecting a ball mark and/or for generating improved ball-tracking data as described herein may be stored in PC 904 and processor 910 of PC 904 may execute the software application locally within PC 904 and interface with a web application on server 902. Particularly, the software application may be stored on a floppy disk or a CD accessible by diskette drive 914 or on fixed disk drive 916. In another aspect, the software application(s) for implementing systems and methods as described herein may be stored in server 902, which may execute the software application, and processor 910 of PC 904 may communicate with server 902 to (i) send information to server 902 and (ii) retrieve the results of the execution of the software application from server 902.

Figure 10:
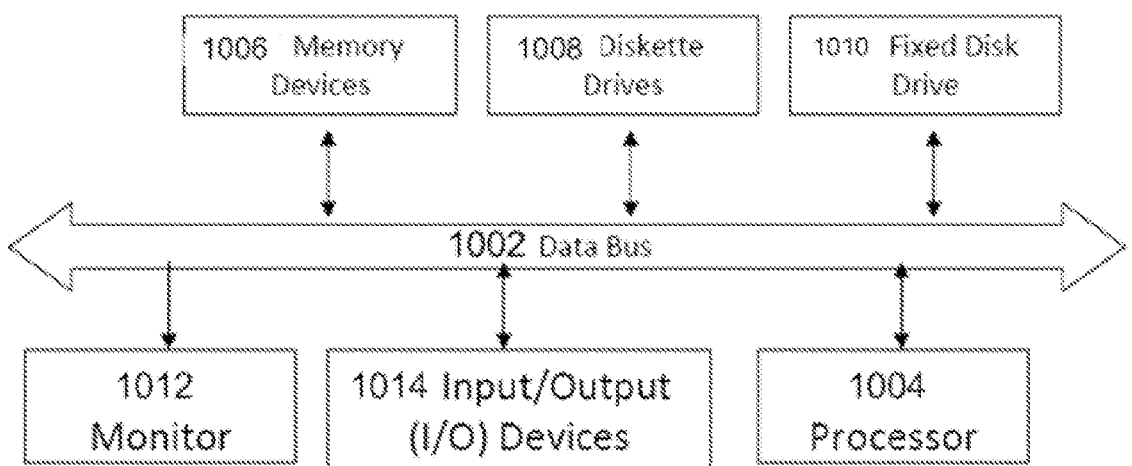
FIG. 10 illustrates a computer system for implementing software applications.

Alternatively, as shown in FIG. 10, a stand-alone PC 1000 may be used for executing software application(s) implementing systems and methods for detecting a ball mark and/or for generating improved ball-tracking data as described herein. PC 1000 may include a bus line 1002 connecting a plurality of devices, which may include a processor 1004, memory devices 1006 for storage of information, diskette drives 1008, a fixed disk drive 1010, a monitor 1012, and other I/O devices 1014. Processor 1004 may be a microprocessor such as an Intel Pentium™ chip for processing applications. Memory devices 1006 may include ROM and/or RAM. Diskette drives 1008 may include a floppy drive and/or a compact disk (CD) drive. Fixed disk drive 1010 may be a hard drive. Monitor 1012 may display the output of processor 1004 and may also echo the input of the user. I/O devices 1014 may include a keyboard and/or a mouse for receiving input from a user of PC 1000.

Software application(s) comprising systems and methods for detecting a ball mark and/or for generating improved ball-tracking data as described herein may be stored on a floppy disk or a CD accessible by diskette drive 1008 or on fixed disk drive 1010. Processor 1004 may execute the software application stored in the floppy disk the CD or the fixed disk drive 1010. An individual, through monitor 1012 and I/O devices 1014, may interact with processor 1004, which may execute the software application(s) implementing systems and methods for detecting a ball mark and/or for generating improved ball-tracking data as described herein.

Systems and methods for detecting a ball mark and/or for generating improved ball-tracking data as described herein may be integrated into a web browser or software application, or may be installed as a plug-in to an existing browser or application. Systems and methods as described herein may also be implemented into any transactional application utilizing frames. Applications used to implement systems and methods as described herein may be run on either the client side or the server side. A software application implementing a ball-mark detection or ball tracking system as described herein may be written in any number of programming languages, including but not limited to C, C++, C#, Delphi, JavaScript, and Flash. Similarly, the present invention is not limited to use with certain applications, networks or networking protocols, Internet browsers or operating systems.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may be practiced within a general purpose computer or in any other circuits or systems.

While certain features and embodiments of the invention have been described, other embodiments of the invention will be apparent to those skilled in the art from consideration of the specification and practice of the embodiments of the invention disclosed herein. Further, the disclosed methods may be modified in any manner, including by reordering stages and/or inserting or deleting stages, without departing from the principles of the invention.

It is intended, therefore, that the specification and examples be considered as exemplary only, with a true scope and spirit of the invention being indicated by the following claims and their full scope of equivalents.

What is claimed is:

1. A process for detecting an optical mark left by an object on a playing surface, comprising
   a. collecting a sequence of images with a digital camera, the sequence of images comprising at least one digital image of the playing surface prior to an impact of the object and at least one digital image of the playing surface after the impact;

b. processing the images of the playing surface taken before and after the impact with a computer processor to enhance changes in optical characteristics of the playing surface that result from the impact and to identify a mark left by the object on the playing surface relative to a feature of the playing surface; and c. transmitting information indicating the position of the object mark relative to the feature of the playing surface to an output device.

2. The process of claim 1, further comprising estimating an impact location of the object on the playing surface using data obtained by at least one radar.

3. The process of claim 2, further comprising using the estimated impact location to reduce the volume of images of the playing surface processed to identify the mark left by the object on the playing surface.

4. The process of claim 1, further comprising estimating an impact time of the object on the playing surface using data obtained by at least one radar.

5. The process of claim 4, wherein the estimating the impact time further comprises differentiating a sequence of speed measurement samples taken from the at least one radar.

6. The process of claim 4, further comprising using the estimated impact time to reduce the volume of images of the playing surface processed to identify the mark left by the object on the playing surface.

7. The process of claim 1, wherein processing the sequence of images comprises adjusting the brightness of the images to an average value.

8. The process of claim 1, wherein processing the sequence of images comprises averaging successive frames of at least a portion of the sequence of images to reduce noise.

9. The process of claim 1, wherein processing the sequence of images comprises filtering out a short-duration fluctuation from at least a portion of the sequence of images.

10. The process of claim 1, wherein processing the sequence of images comprises differencing the sequence of images to produce an image of the mark on the playing surface left by the impact.

11. The process of claim 10, wherein the processing the sequence of images further comprises fitting an ellipse to the image of the mark on the playing surface.

12. The process of claim 1, further comprising processing the sequence of images to compensate for displacement in the images.

13. The process of claim 1, further comprising determining whether the mark touches the surface feature.

14. The process of claim 1, further comprising determining whether the mark is in bounds or out of bounds.

15. The process of claim 1, further comprising measuring a distance by which the mark overlaps or misses the surface feature.

16. The process of claim 1, further comprising using the position of the mark on the playing surface to improve the accuracy of object-tracking data obtained by at least one radar.

17. The process of claim 1, further comprising producing a computer-generated image of the mark and surface feature.

18. The process of claim 17, further comprising transmitting the computer-generated image of the mark and surface feature to a display device.

19. The process of claim 17, further comprising transmitting the computer-generated image to a broadcast system.

20. The process of claim 1, wherein the mark on the playing surface is not visible to the naked eye.

21. A system for detecting an optical mark left by an impact of an object on a playing surface, the system comprising
a. at least one processor coupled to a memory arrangement;
b. at least one camera for collecting a sequence of images comprising at least one digital image of the playing surface prior to an impact of an object on the playing surface and at least one digital image of the playing surface after the impact;
c. an image processing system adapted to process at least a portion of the sequence of images to identify the mark left by the object on the playing surface.

22. The system of claim 21, further comprising a judgment processing system operative to determine the position of the mark relative to a feature of the playing surface.

23. The system of claim 22, wherein the judgment processing system is operative to determine whether the mark touched the feature of the playing surface.

24. The system of claim 22, wherein the judgment processing system is operative to determine the distance by which the mark overlaps or is separated from the feature of the playing surface.

25. The system of claim 22, further comprising a judgment output device operative to display information relating to the position of the mark relative to the feature of the playing surface.

26. The system of claim 22, further comprising at least one radar system operative to collect data relating to a trajectory of the object and determine at least one of an estimated time and location of the impact of the object on the playing surface to reduce the volume of the sequence of images processed by the image processing system.

27. The system of claim 21, further comprising a display unit operative to display the image of the mark relative to the feature of the playing surface.

28. The system of claim 21, wherein the at least one camera comprises an optical filter selected to reduce glare and enhance the contrast of the mark on the playing surface.

29. A system for detecting an optical mark left by an impact of an object on a playing surface, the system comprising
a. at least one processor coupled to a memory arrangement;
b. at least one camera for collecting a sequence of images comprising at least one digital image of the playing surface prior to an impact of an object on the playing surface and at least one digital image of the playing surface after the impact; and
c. an image processing system adapted to perform differencing on at least a portion of the sequence of images to identify the mark left by the object on the playing surface.

30. The system of claim 29, further comprising a judgment processing system operative to use edge detection to determine the position of the mark left by the object on the playing surface relative to a feature of the playing surface.

31. The system of claim 30, wherein the judgment processing system is further operative to perform curve fitting to determine the position of the ball mark relative to the playing surface.

32. The system of claim 29, wherein the playing surface is a tennis court.

33. The system of claim 29, wherein the playing surface is a cricket pitch.

* * * * *

UNITED STATES PATENT AND TRADEMARK OFFICE
CERTIFICATE OF CORRECTION

PATENT NO. : 8,189,857 B2  Page 1 of 1
APPLICATION NO. : 12/205498
DATED : May 29, 2012
INVENTOR(S) : Johnson et al.

It is certified that error appears in the above-identified patent and that said Letters Patent is hereby corrected as shown below:

On the face page 1, under "Other Publications", in column 2, line 17, before "International", insert --"--, therefor On the face page 1, under "Other Publications", in column 2, line 19, after "2009.", insert --"--, therefor In column 18, line 65, in Claim 1, after "comprising", insert --:--, therefor In column 20, line 4, in Claim 21, after "comprising", insert --:--, therefor In column 20, line 41, in Claim 29, after "comprising", insert --:--, therefor Signed and Sealed this
Thirteenth Day of November, 2012

David J. Kappos
*Director of the United States Patent and Trademark Office*